(12) United States Patent
Zhang et al.

(10) Patent No.: US 11,316,372 B2
(45) Date of Patent: *Apr. 26, 2022

(54) DRIVING CIRCUIT AND WIRELESS POWER TRANSMITTER INCLUDING THE SAME

(71) Applicant: Silergy Semiconductor Technology (Hangzhou) LTD, Hangzhou (CN)

(72) Inventors: Wang Zhang, Hangzhou (CN); Wei Chen, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 182 days.

This patent is subject to a terminal disclaimer.

(21) Appl. No.: 16/505,793

(22) Filed: Jul. 9, 2019

(65) Prior Publication Data

US 2019/0334382 A1 Oct. 31, 2019

Related U.S. Application Data

(63) Continuation of application No. 15/211,023, filed on Jul. 15, 2016, now Pat. No. 10,396,597.

(30) Foreign Application Priority Data

Jul. 17, 2015 (CN) .......................... 201510424772.2

(51) Int. Cl.
*H02J 50/12* (2016.01)
*H02J 7/02* (2016.01)

(52) U.S. Cl.
CPC .............. *H02J 50/12* (2016.02); *H02J 7/025* (2013.01)

(58) Field of Classification Search
CPC ........ H02J 50/12; H02J 7/025; H02M 7/5395; H02M 7/5387; H02M 2001/007
See application file for complete search history.

(56) References Cited

U.S. PATENT DOCUMENTS 10,079,090 B2 * 9/2018 Teggatz ............... H04B 5/0031
10,135,305 B2 * 11/2018 Muratov ................ H02J 50/12
(Continued)

FOREIGN PATENT DOCUMENTS

| CN | 103683530 A | 3/2014 |
|---|---|---|
| CN | 104701998 A | 6/2015 |
| CN | 104953881 A | 9/2015 |

*Primary Examiner* — Jared Fureman
*Assistant Examiner* — Michael J Warmflash

(57) ABSTRACT

The present disclosure relates to a driving circuit and a wireless power transmitter including the same. In view of the fact that a transmitter-side coupling circuit exhibits a high resistance when an AC current having a frequency far away from its operating frequency is applied to input terminals, the present disclosure connects a plurality of transmitter-side coupling circuits which operates at different operating frequencies in parallel at output terminals of the same inverting circuit. The controller controls an operating frequency of the AC current output from the inverting circuit to drive different one of the transmitter-side coupling circuits to operate. Thus, one driving circuit can drive the transmitter-side coupling circuits which operate at different operating frequencies or under different technical standards to supply electric energy. The driving circuit is compatible with wireless power receivers which operate at different operating frequencies, and thus has improved compatibility.

19 Claims, 5 Drawing Sheets

(56) References Cited

U.S. PATENT DOCUMENTS

| | | | |
|---|---|---|---|
| 10,396,597 B2* | 8/2019 | Zhang | H02J 50/12 |
| 2010/0188041 A1* | 7/2010 | Mizuo | H02J 50/402 |
| | | | 320/108 |
| 2013/0009462 A1 | 1/2013 | Amano et al. | |
| 2015/0022147 A1 | 1/2015 | Jung | |
| 2015/0115730 A1* | 4/2015 | Kanno | H02J 50/00 |
| | | | 307/104 |
| 2015/0145473 A1 | 5/2015 | Shen et al. | |
| 2016/0079797 A1* | 3/2016 | Jeong | H02J 7/025 |
| | | | 320/108 |
| 2016/0285278 A1* | 9/2016 | Mehas | H02J 50/12 |
| 2016/0308397 A1 | 10/2016 | Jung et al. | |

* cited by examiner

US 11,316,372 B2

DRIVING CIRCUIT AND WIRELESS POWER TRANSMITTER INCLUDING THE SAME

CROSS-REFERENCE TO RELATED APPLICATION

This application is a continuation of the following application, U.S. patent application Ser. No. 15/211,023, filed on Jul. 15, 2016, and which is hereby incorporated by reference as if it is set forth in full in this specification, and which also claims the benefit of Chinese Patent Application No. 201510424772.2, filed on Jul. 17, 2015, which is incorporated herein by reference in its entirety.

BACKGROUND OF THE DISCLOSURE

Field of the Disclosure

The present disclosure generally relates to the field of power electronics, and more particularly, to wireless power transmission, and further more particularly, to a driving circuit and a wireless power transmitter including the same.

Background of the Disclosure

Wireless power transmission is also referred to as non-contact power transmission, which transfers electric energy by coupling between a power transmitter and a power receiver in a non-contact manner by electromagnetic induction or magnetic resonance. For the beneficial effect of convenience and availability, the wireless power transmission is widely used in electronic products such as mobile phones, MP3 players, digital cameras, portable computers, and low-power household appliances.

The wireless power transmission may be implemented under several different technical standards. A conventional wireless power transmission system typically supports only one technical standard, and can only be used in a specific product under the one technical standard. Thus, the conventional wireless power transmission has poor compatibility.

SUMMARY OF THE DISCLOSURE

In view of this, the present disclosure provides a driving circuit and a wireless power transmitter including the same, which is compatible with wireless power receivers having different operating frequencies, and thus has improved compatibility.

According to one aspect of the present disclosure, there is provided a driving circuit for driving transmitter-side coupling circuits at a wireless power transmitter, comprising:

an inverting circuit being configured to covert a DC current to an AC current, and to output the AC current at output terminals, which are suitable for being coupled to a first transmitter-side coupling circuit and a second transmitter-side coupling circuit;

a control circuit being configured to control the inverting circuit to output a first AC current having a first frequency for driving the first transmitter-side coupling circuit, or to output a second AC current having a second frequency for driving the second transmitter-side coupling circuit, in each cycle;

wherein the first transmitter-side coupling circuit is a high-resistance circuit when the second AC current having the second frequency is applied, and the second transmitter-side coupling circuit is a high-resistance circuit when the first AC current having the first frequency is applied.

Preferably, the control circuit comprises:

a configuration interface being configured to receive a driving mode of the wireless power transmitter;

wherein the control circuit controls the inverting circuit to drive the first transmitter-side coupling circuit or the second transmitter-side coupling circuit to operate independently, or to drive the first transmitter-side coupling circuit and the second transmitter-side coupling circuit to operate alternately, in accordance with the driving mode.

Preferably, the driving circuit further comprises:

a first detection circuit being configured to detect whether the first transmitter-side coupling circuit is electrically coupled to a load which needs electric energy or not, and to provide a first detection signal, a second detection circuit being configured to detect whether the second transmitter-side coupling circuit is electrically coupled to a load which needs electric energy or not, and to provide a second detection signal, wherein the control circuit controls the inverting circuit to drive the first transmitter-side coupling circuit to transfer electric energy and to receive the first detection signal from a first detection circuit in one cycle, and to drive the second transmitter-side coupling circuit to transfer electric energy and to receive the second detection signal from a second detection circuit in another cycle.

Preferably, in a case that the first detection signal indicates that the first transmitter-side coupling circuit is electrically coupled to a load which needs electric energy, the control circuit is configured to control the inverting circuit to drive the first transmitter-side coupling circuit to transfer electric energy, until the first detection signal indicates that the load is disconnected or does not need electric energy, and to drive the second transmitter-side coupling circuit to transfer electric energy in next one cycle; and in a case that the second detection signal indicates that the second transmitter-side coupling circuit is electrically coupled to a load which needs electric energy, the control circuit is configured to control the inverting circuit to drive the second transmitter-side coupling circuit to transfer electric energy, until the second detection signal indicates that the load is disconnected or does not need electric energy, and to drive the first transmitter-side coupling circuit to transfer electric energy in next one cycle.

Preferably, in a case that the first detection signal indicates that the first transmitter-side coupling circuit is electrically coupled to a load which needs electric energy, the control circuit is configured to control the inverting circuit to drive the first transmitter-side coupling circuit to transfer electric energy continuously, until a predetermined number of cycles elapse, and to drive the second transmitter-side coupling circuit to transfer electric energy in next one cycle; and in a case that the second detection signal indicates that the second transmitter-side coupling circuit is electrically coupled to a load which needs electric energy, the control circuit is configured to control the inverting circuit to drive the second transmitter-side coupling circuit to transfer electric energy continuously, until a predetermined number of cycles elapse, and to drive the first transmitter-side coupling circuit to transfer electric energy in next one cycle.

Preferably, the control circuit turns off switches of the inverting circuit until a predetermined reset time elapses before switching the transmitter-side coupling circuit which is active.

Preferably, in a case that the control circuit receives the first detection signal and the second detection signal in two successive cycles, which indicate that none of the first transmitter-side coupling circuits and the second transmitter-side coupling circuits is electrically coupled to the load which needs electric energy, the control circuit controls the wireless power transmitter in a standby state for a predetermined time period.

Preferably, the first detection circuit detects the load by detecting fluctuation in the first transmitter-side coupling circuit; and the second detection circuit detects the load by receiving a signal from a communication module under a short-range wireless communication protocol.

Preferably, the driving circuit comprises:

a DC-DC converter being electrically coupled between power supply terminals and input terminals of the inverting circuit, and being configured to adjust an input voltage of the inverting circuit in accordance with the load.

Preferably, the DC-DC converter is configured to adjust an input voltage of the inverting circuit to have a first value when the inverting circuit is switched to drive the first transmitter-side coupling circuit, and to adjust the input voltage of the inverting circuit to have a second value when the inverting circuit is switched to drive the second transmitter-side coupling circuit.

According to another aspect of the present disclosure, there is provided a wireless power transmitter, comprises:

the above-mentioned driving circuit;

a first transmitter-side coupling circuit which is electrically coupled to output terminals of the inverting circuit and is configured to transfer electric energy by a first AC current having a first frequency;

a second transmitter-side coupling circuit which is electrically coupled to the output terminals of the inverting circuit and is configured to transfer electric energy by a second AC current having a second frequency, wherein the first transmitter-side coupling circuit is a high-resistance circuit when the second AC current having the second frequency is applied, and the second transmitter-side coupling circuit is a high-resistance circuit when the first AC current having the first frequency is applied.

In view of the fact that a transmitter-side coupling circuit exhibits a high resistance when an AC current having a frequency far away from its operating frequency is applied to input terminals, the present disclosure connects a plurality of transmitter-side coupling circuits which operates at different operating frequencies in parallel at output terminals of the same inverting circuit. The controller controls an operating frequency of the AC current output from the inverting circuit to drive different one of the transmitter-side coupling circuits to operate. Thus, one driving circuit can drive the transmitter-side coupling circuits which operate at different operating frequencies or under different technical standards to supply electric energy. The driving circuit is compatible with wireless power receivers which operate at different operating frequencies, and thus has improved compatibility.

BRIEF DESCRIPTION OF THE DRAWINGS

The above and other objects, advantages and features of the present disclosure will become more fully understood from the detailed description given hereinbelow in connection with the appended drawings, and wherein.

DETAILED DESCRIPTION OF THE DISCLOSURE

Reference will now be made in detail to particular embodiments of the disclosure, it will be understood that the scope of the present disclosure is not limited to these embodiments. Furthermore, in the following detailed description of the present disclosure, numerous specific details are set forth in order to provide a thorough understanding of the present disclosure. However, it will be readily apparent to one skilled in the art that the present disclosure may be practiced without these specific details. In other instances, well-known methods, procedures, processes, components, and circuits have not been described in detail so as not to unnecessarily obscure aspects of the present disclosure.

Furthermore, it will be understood by one skilled in the art that attached drawings are to be regarded as illustrative, and may not be drawn to scale.

Also, it will be understood in the following description that the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection of two components can be physical or logical connection, or physical and logical connection. On the contrary, when one component is referred to as being "coupled directly to" or "connected directly to" another component, there will be no an intermediate component between two components.

Where the term "comprising" or "including" is used in the present description and claims, it does not exclude other elements or steps, unless something otherwise is specifically stated. That is, it means "including, but not limited to".

In the following description that the terms such as "first", "second" and the like are used herein for purposes of description and are not intended to indicate or imply relative importance or significance. The term "plurality", as used herein, is defined as two or more than two, unless something otherwise is specifically stated.

Figure 1:
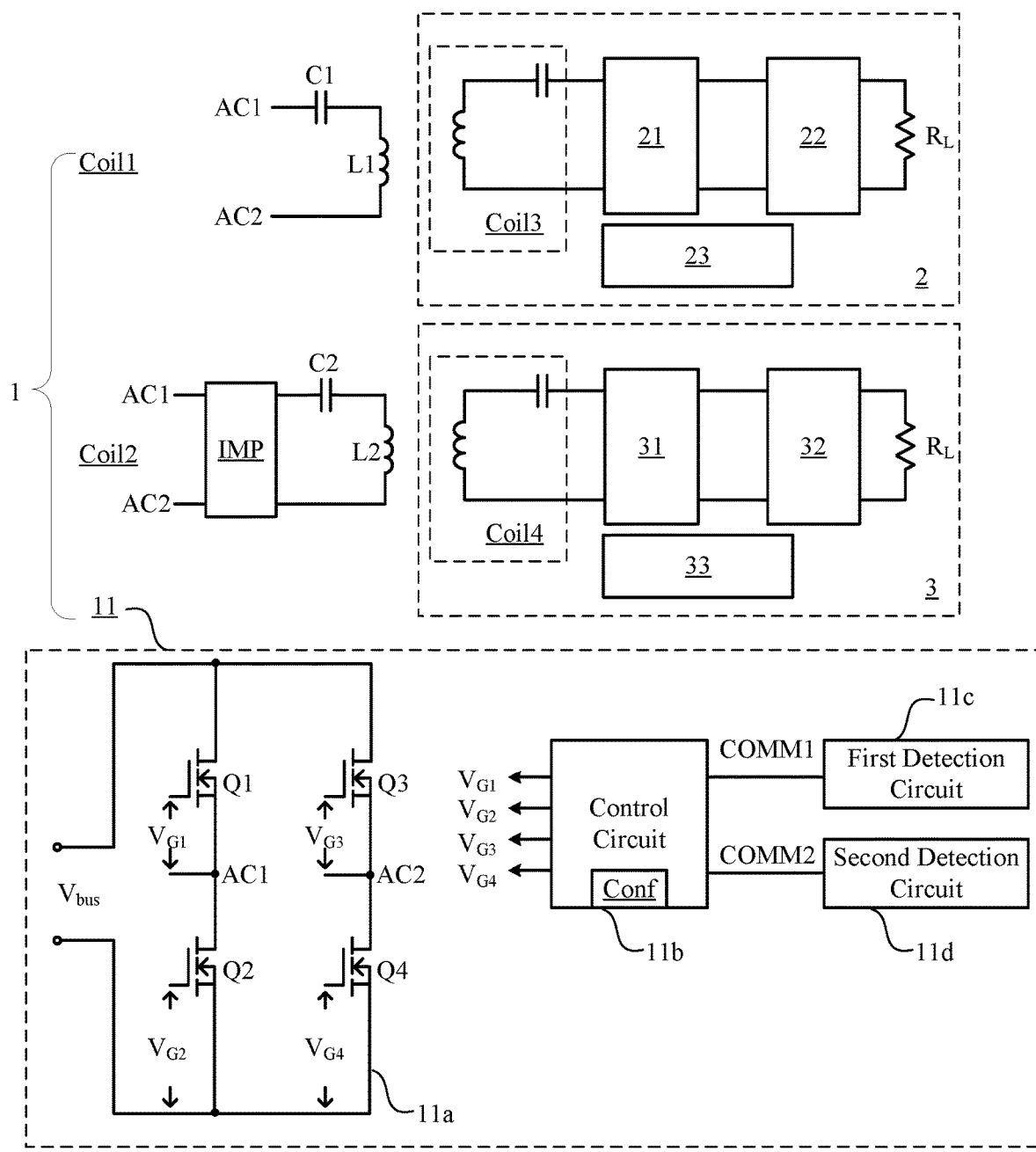
FIG. 1 is a schematic diagram of an example wireless power supply system according to an embodiment of the present disclosure.

FIG. 1 is a schematic diagram of an example wireless power supply system according to an embodiment of the present disclosure. As shown in FIG. 1, the wireless power supply system includes a wireless power transmitter 1, a first wireless power receiver 2, and a second wireless power receiver 3. The first wireless receiver 2 is configured to receiver electric energy in a non-contact manner at the first operating frequency, and the second wireless power receiver 3 is configured to receive electric energy in a non-contact manner at the second operating frequency. The first operating frequency is far away from the second operating frequency.

The wireless power transmitter 1 includes a first transmitter-side coupling circuit Coil1, a second transmitter-side coupling circuit Coil2, and a driving circuit 11. The first wireless power receiver 2 is coupled to the first transmitter-side coupling circuit Coil1, and the second wireless power receiver 3 is coupled to the second transmitter-side coupling circuit Coil2. The first transmitter-side coupling circuit Coil1 may overlap with the second transmitter-side coupling circuit Coil2, or may not. When the first transmitter-side coupling circuit Coil1 overlaps with the second transmitter-side coupling circuit Coil2, only one of them can be placed at a coupling position at one time. When the first transmitter-side coupling circuit Coil1 does not overlap with the second transmitter-side coupling circuit Coil2, both of them can be placed at respective coupling positions at one time. Meanwhile, the driving circuit 11 drives the first transmitter-side coupling circuit Coil1 and the second transmitter-side coupling circuit Coil2 to operate alternately, so as to drive two loads.

In this embodiment, a first power wireless receive 2 under Qi standard and a second wireless power receiver 3 under a wireless power supply standard issued by A4WP are described as an example. Qi standard is a wireless power supply standard issued by Wireless Power Consortium (WPC), which supports wireless power supply or charging in an electromagnetic manner at an operating frequency in a range of 100-200 KHz. The wireless power supply standard issued by Alliance for Wireless Power (A4WP), supports wireless power supply or charging in a magnetic resonance manner at an operating frequency of 6.78 MHz. The two operating frequencies are different from and far away from each other.

In this embodiment, the first transmitter-side coupling circuit Coil1 may be the one under the Qi standard, including a transmitting coil L1 which is coupled with a coil of a power receiver in a non-contact manner to supply electric energy. The first transmitter-side coupling circuit Coil1 may be coupled to the wireless power receiver in an electromagnetic manner at an operating frequency in a range of 100-200 KHz, under the Qi standard.

The second transmitter-side coupling circuit Coil2 may be the one under the wireless power supply standard issued by A4WP, including a transmitting coil L2 which is coupled with a coil of a power receiver in a non-contact manner to supply electric energy. The second transmitter-side coupling circuit Coil2 may be coupled to the wireless power receiver in a magnetic resonance at an operating frequency of 6.78 MHz, under the A4WP standard. Meanwhile, the second transmitter-side coupling circuit Coil2 may further include an impedance matching circuit IMP, which adjusts an input current/voltage of the transmitting coil L2 in accordance with a status of a load so as to maximize system efficiency.

Transmitter capacitors C1-C2 may be included in the transmitter-side coupling circuit, which are connected in series or in parallel with the transmitting coils L1-L2, so as to increase efficiency of the wireless transmitter in the transmitter-side coupling circuit. Obviously, one skilled in the art can understand that in some cases, distributed capacitance (for example, among wires of the transmitting coil) of the circuit may be used as the transmitter capacitor so that an additional capacitor can be omitted in the circuit.

Thus, when the first transmitter-side coupling circuit Coil1 and the second transmitter-side coupling circuit Coil2 are connected in parallel at output terminals AC1-AC2 for receiving an AC current, the first transmitter-side coupling circuit Coil1 exhibits a high resistance when an AC current of a second frequency (for example, 6.7 MHz) is input. In such case, the AC current flows into only the second transmitter-side coupling circuit Coil2. The second transmitter-side coupling circuit Coil2 exhibits a high resistance when an AC current of a first frequency (for example, 200 kHz) is output at the output terminals. In such case, the AC current flows into only the first transmitter-side coupling circuit Coil1.

Due to the above characteristics, the driving circuit 11 drives only one of the first transmitter-side coupling circuit Coil1 and the second transmitter-side coupling circuit Coil2 to operate at one time by controlling a frequency of the AC current which is output. The driving circuit 11 may drive one specific transmitter-side coupling circuit to operate according to user settings, or drive one of the two transmitter-side coupling circuits to operate according to detection of a load, or drive both transmitter-side coupling circuits to operate alternately so as to supply electric energy to two loads at the same time in a time period.

The driving circuit 11 includes an inverting circuit 11a and a control circuit 11b.

The inverting circuit 11a coverts a DC current into an AC current, and outputs the AC current at the output terminals AC1-AC2, which are suitable for being coupled to a first transmitter-side coupling circuit Coil1 and a second transmitter-side coupling circuit Coil2. Specifically, the inverting circuit 11a may be a full-bridge circuit including four switches Q1-Q4 as shown in FIG. 1, or a half-bridge circuit including two switches, or any other type of inverting circuits which can output AC currents with different frequencies under the control of the control circuit.

Figure 2:
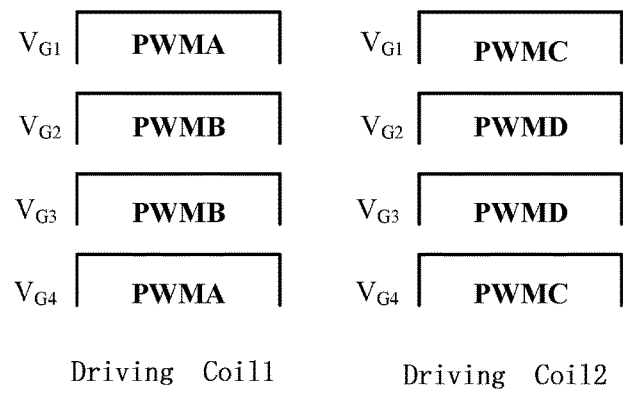
FIG. 2 is a waveform diagram showing driving signals of switches of an example inverting circuit according to an embodiment of the present disclosure, when driving respective ones of the transmitter-side coupling circuits.

FIG. 2 is a waveform diagram showing driving signals of switches of an example according to an embodiment of the present disclosure, when the inverting circuit drives respective ones of the transmitter-side coupling circuits. As shown in FIG. 2, the first pulse-width modulation signal PWMA and the second pulse-width modulation signal PWMB are complementary ones, with or without a dead zone. The third pulse-width modulation signal PWMC and the fourth pulse-width modulation signal PWMD are complementary ones, with or without a dead zone. In one embodiment according to the present disclosure, the dead zone is a delay time after the pulse-width modulation signals turn off the first switch of the half-bridge circuit and before the pulse-width modulation signals turn on the second switch of the half-bridge circuit, or a delay time after the pulse-width modulation signals turn off the second switch of the half-bridge circuit and before the pulse-width modulation signals turn on the first switch of the half-bridge circuit. So that the power devices are protected from damage. In a case that two different pulse-width modulation signals are used to drive the first switch and the second switch independently, there is a time period during which the two pulse-width modulation signals turn off the switches, for example, at a low level. The time period is referred to as the dead zone. In one embodiment according to the present disclosure, the switches Q1-Q4 are controlled by the control signals $V_{G1}$-$V_{G4}$. It should be understood that the control signals are voltages between a control terminal of the switch and one terminal of the switch having a relatively low value.

The first pulse-width modulation signal PWMA and the second pulse-width modulation signal PWMB have a first frequency (for example, 200 kHz), for controlling the inverting circuit to output an AC current having the first frequency. Moreover, the third pulse-width modulation signal PWMC and the fourth pulse-width modulation signal PWMD have a second frequency (for example, 6.78 MHz), for controlling the inverting circuit to output an AC current having the second frequency.

When driving the first transmitter-side coupling circuit, the switches Q1-Q4 of the inverting circuit 11 are controlled by the pulse-width modulation signals PWMA, PWMB, PWMB and PWMA respectively, to output an AC current having the first frequency.

When driving the second transmitter-side coupling circuit, the switches Q1-Q4 of the inverting circuit 11 are controlled by the pulse-width modulation signals PWMC, PWMD, PWMD and PWMC respectively, to output an AC current having the second frequency.

The control circuit 11b controls the inverting circuit to output a first AC current having a first frequency for driving the first transmitter-side coupling circuit Coil1, or outputs a second AC current having a second frequency for driving the second transmitter-side coupling circuit Coil2, in each cycle. The cycle may be set in advance. In each cycle, the control circuit 11b controls the inverting circuit 11a to output an AC current having a fixed frequency. Due to different frequencies of the AC current which is output, only one of the first transmitter-side coupling circuit Coil1 and the second transmitter-side coupling circuit Coil2 operates in this cycle.

Thus, in view of the fact that a transmitter-side coupling circuit exhibits a high resistance when an AC current having a frequency far away from its operating frequency is applied to input terminals, a plurality of transmitter-side coupling circuits which operates at different operating frequencies are connected at the output terminals of the same inverting circuit. The controller controls an operating frequency of the AC current output from the inverting circuit to drive different one of the transmitter-side coupling circuits to operate. Thus, one driving circuit can drive the transmitter-side coupling circuits which operate at different operating frequencies or under different technical standards to supply electric energy. The driving circuit is compatible with wireless power receivers which operate at different operating frequencies, and thus has improved compatibility.

As shown in FIG. 1, the first wireless power receiver 2 includes a first receiver-side coupling circuit Coil3, a rectifier circuit 21, a DC-DC converter 22, and a communication circuit 23. The first receiver-side coupling circuit Coil3 is the one which is suitable for being coupled to the first transmitter-side coupling circuit Coil1 to receive electric energy by electromagnetic induction. The rectifier circuit 21 is configured to rectify the received AC current to generate a DC current. The DC-DC converter 22 may adjust an output voltage or current in view of the status of the load. The communication circuit 23 is configured to communicate with the wireless power transmitter and feed back information about the wireless power receiver, including information about whether the wireless power receiver needs to be charged or not, or information about whether a load of the wireless power receiver has been changed or not. The information may be transmitted after that the wireless power receiver and the wireless power transmitter establish electronic coupling. In this embodiment, the communication circuit 23 may introduce fluctuation in the current/voltage of the transmitter-side coupling circuit by changing the load of the wireless power receiver to feed back the information. In such case, the communication circuit 23 may have a circuit which is connected in parallel with the load and have a controller for the circuit.

Moreover, the second wireless power receiver 3 includes a second receiver-side coupling circuit Coil4, a rectifier circuit 31, a DC-DC converter 32, and a communication circuit 33. The second receiver-side coupling circuit Coil4 is the one which is suitable for being coupled to the second transmitter-side coupling circuit Coil2 to receive electric energy by magnetic resonance. The rectifier circuit 31 is configured to rectify the received AC current to generate a DC current. The DC-DC converter 32 may adjust an output voltage or current in view of the status of the load. The communication circuit 33 is configured to communicate with the wireless power transmitter and feed back information about the wireless power receiver, including information about whether the wireless power receiver needs to be charged or not, or information about whether a load of the wireless power receiver has been changed or not. In this embodiment, the communication circuit 33 may also feed back the above information by a communication link under a short-range wireless communication protocol, such as Bluetooth protocol or infrared communication protocol. In such case, the communication circuit 33 is a wireless communication module under the short-range wireless communication protocol.

It should be understood that the first wireless power receiver 2 is a device under the Qi standard (including a coupling manner and a communication manner with the transmitter-side coupling circuit) and the second wireless power receiver 3 is a device under the standard issued by A4WP (including a coupling manner and a communication manner with the transmitter-side coupling circuit), which are described only as an example. Instead, the power transmitter in an embodiment of the present disclosure may also be coupled to different power receivers, in the same or different coupling manners/communication manners, as long as the different power receivers receive AC current having different operating frequencies which are far away from each other for establishing electromagnetic coupling.

Moreover, as shown in FIG. 1, the control circuit 11b further includes a configuration interface Conf (preferably, an I$^2$C interface), for receiving a driving mode of the wireless power transmitter. The control circuit 11b controls the inverting circuit to drive the first transmitter-side coupling circuit or the second transmitter-side coupling circuit to operate independently, or to drive the first transmitter-side coupling circuit and the second transmitter-side coupling circuit to operate alternately, in accordance with the driving mode. Thus, a user of the wireless power transmitter can set an operating mode of the wireless power transmitter so that it can be used in various applications. For example, the user may preset the driving mode as driving only the first transmitter-side coupling circuit to provide a wireless power transmitter under the Qi standard. Moreover, the user may preset the driving mode as driving only the second transmitter-side coupling circuit to provide a wireless power transmitter under the standard issued by A4WP. For example, the user may set the driving mode as driving the first transmitter-side coupling circuit and the second transmitter-side coupling circuit alternately to provide a novel standard which is compatible with two different standards.

Moreover, the wireless power transmitter according to one embodiment of the present disclosure can operate in sequence or in a time-division mode. In both cases, one transmitter-side coupling circuit is driven to transfer electric energy each time, so that a plurality of transmitter-side coupling circuits transfers electric energy alternately. The difference between two modes is as follows. In the sequence mode, the control circuit 11b controls the inverting circuit 11a to steadily supply electric energy to one transmitter-side coupling circuit which is coupled to a load which needs electric energy, until the load does not need electric energy or is disconnected, and then to next one transmitter-side coupling circuit. However, in the time-division mode, the control circuit 11b controls the inverting circuit 11a to supply electric energy to each transmitter-side coupling circuit which is coupled to a load which needs electric energy, continuously for a predetermined number of cycles.

In this embodiment, the wireless power transmitter further includes a first detection circuit 11c and a second detection circuit 11d. The first detection circuit 11c is used for detecting whether the first transmitter-side coupling circuit Coil1 is coupling to a load which needs electric energy or not, and the second detection circuit 11d is used for detecting whether the second transmitter-side coupling circuit Coil2 is coupling to a load which needs electric energy or not. As an example, the first transmitter-side coupling circuit Coil1 is the one under the Qi standard, and the second transmitter-side coupling circuit Coil2 is the one under the standard issued by A4WP. The first detection circuit 11c may detect whether the coupling is established or not by fluctuation in an input current of the coil. The second detection circuit 11d may detect whether the coupling is established or not by receiving a signal transmitted under Bluetooth protocol. It should be understood that the first detection circuit 11c and the second detection circuit 11d may be the same type of detection circuit, which depends on signal feedback approaches of the wireless power receivers corresponding to the first transmitter-side coupling circuit Coil1 and the second transmitter-side coupling circuit Coil2.

In order to detect whether a load is connected or not, the control circuit 11b controls the inverting circuit 11a to drive the first transmitter-side coupling circuit Coil1 to transfer electric energy and to receive the first detection signal COMM1 from a first detection circuit 11c in one cycle, and to drive the second transmitter-side coupling circuit to transfer electric energy and to receive the second detection signal COMM2 from a second detection circuit 11d in another cycle. In accordance with the first detection signal COMM1 and the second detection signal COMM2, the control circuit 11b can determine any transmitter-side coupling circuit that is coupled to a load which needs electric energy, for controlling in a further process. In an embodiment according to the present disclosure, each time when the control circuit 11b detects that one transmitter-side coupling circuit is not coupled to a load in a current cycle, the control circuit 11b may switch to drive the other transmitter-side coupling circuit and detect whether the other transmitter-side coupling circuit is coupled to a load which needs electric energy in a next cycle. In a case that the control circuit receives the first detection signal and the second detection signal in two successive cycles, which indicate that none of the first transmitter-side coupling circuit and the second transmitter-side coupling circuit is electrically coupled to the load which needs electric energy, the control circuit controls the wireless power transmitter in a standby state for a predetermined time period. Thus, the load detection is performed in a manner similar to "polling" so as to increase efficiency.

Figure 3:
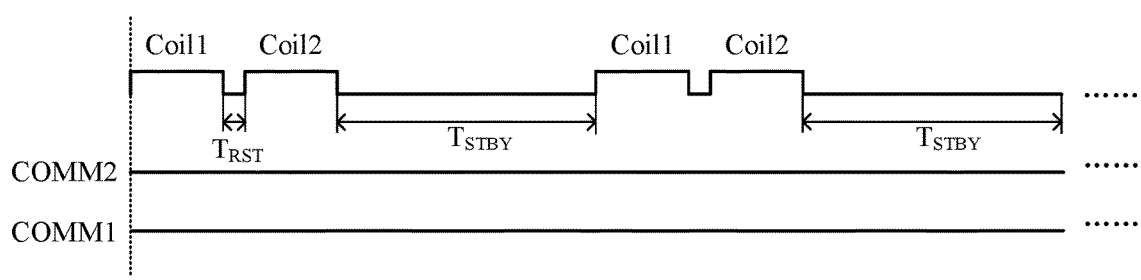
FIG. 3 is a waveform diagram of an example wireless power transmitter according to an embodiment of the present disclosure, without a load which needs electric energy being coupled thereto.

FIG. 3 is a waveform diagram of an example wireless power transmitter according to an embodiment of the present disclosure, without a load which needs electric energy being coupled thereto. As shown in FIG. 3, in the first cycle, the control circuit 11b controls the inverting circuit 11a to drive the first transmitter-side coupling circuit Coil1 to operate to transfer electric energy, and performs load detection for the first transmitter-side coupling circuit Coil1. In the second cycle, the control circuit 11b controls the inverting circuit 11a to drive the second transmitter-side coupling circuit Coil2 to operate to transfer electric energy, and performs load detection for the second transmitter-side coupling circuit Coil2. Because there is no load being detected, the control circuit 11b controls the wireless power transmitter in a standby state for a predetermined time period $T_{STBY}$, during which the inverting circuit stops its operation. Thus, the power consumption may be greatly reduced in a case there is no load.

Preferably, the control circuit controls the switches of the inverting circuit to be turned off, until a predetermined reset time $T_{RST}$ elapses before switching the transmitter-side coupling circuit which is active. Thus, it avoids damage of power devices due to switching the driving signals.

After the standby state, the control circuit 11b starts new detection. The first transmitter-side coupling circuit Coil1 and the second transmitter-side coupling circuit Coil2 are driven in two cycles alternately, for detecting whether a load is coupled thereto or not. In a case that there is no a load having been detected, the wireless power transmitter is controlled to be in a standby state again.

In a sequence mode, in a case that the first detection signal COMM1 indicates that the first transmitter-side coupling circuit Coil1 is electrically coupled to a load which needs electric energy, the control circuit 11b is configured to control the inverting circuit 11a to drive the first transmitter-side coupling circuit Coil1 to transfer electric energy, until the first detection signal COMM1 indicates that the load is disconnected or does not need electric energy, and to drive the second transmitter-side coupling circuit Coil2 to transfer electric energy in next one cycle.

In a case that the second detection signal COMM2 indicates that the second transmitter-side coupling circuit Coil2 is electrically coupled to a load which needs electric energy, the control circuit 11b is configured to control the inverting circuit 11a to drive the second transmitter-side coupling circuit Coil2 to transfer electric energy, until the second detection signal COMM2 indicates that the load is disconnected or does not need electric energy, and to drive the first transmitter-side coupling circuit Coil1 to transfer electric energy in next one cycle.

Figure 4:
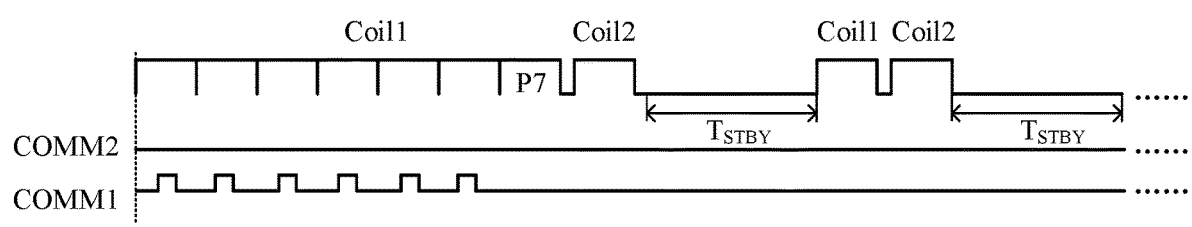
FIG. 4 is a waveform diagram of an example wireless power transmitter according to an embodiment of the present disclosure, when operated in a sequence mode.

FIG. 4 is a waveform diagram of an example wireless power transmitter according to an embodiment of the present disclosure, when operated in a sequence mode. FIG. 4 illustrates timing sequences in a sequence mode when there is only one transmitter-side coupling circuit being coupled to a load. As shown in FIG. 4, in the first cycle, the control circuit 11b controls the inverting circuit 11a to drive the first transmitter-side coupling circuit Coil1 to operate to transfer electric energy, and performs load detection for the first transmitter-side coupling circuit Coil1. In such case, the first detection signal COMM1 indicates that there is a load which needs electric energy. Thus, the control circuit 11b controls the inverting circuit 11a to drive the first transmitter-side coupling circuit Coil1 to transfer electric energy, until the seventh cycle (P7). In the seventh cycle, the first detection signal COMM1 indicates that the load is disconnected or does not need electric energy. In such case, the control circuit 11b switches to control inverter 11a in the next cycle (i.e. the eighth cycle) to drive the second transmitter-side coupling circuit Coil2 to operate to transfer electric energy, and performs load detection for the second transmitter-side coupling circuit Coil2. There is no a load having been detected. The control circuit 11b does not detect the load in two successive cycles. That is, none of the transmitter-side coupling circuits is coupled to a load. Thus, the control circuit 11b controls the wireless power transmitter to be in a standby state for a predetermined time period $T_{STBY}$. After the standby state, the control circuit 11b starts new detection. The first transmitter-side coupling circuit Coil1 and the second transmitter-side coupling circuit Coil2 are driven in two cycles alternately, for detecting whether a load is coupled thereto or not. In a case that there is no a load having been detected, the wireless power transmitter is controlled to be in a standby state again.

Figure 5:
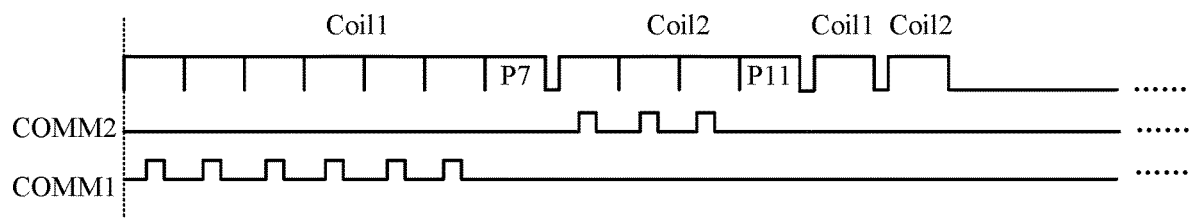
FIG. 5 is another waveform diagram of an example wireless power transmitter according to an embodiment of the present disclosure, when operated in a sequence mode.

FIG. 5 is another waveform diagram of an example wireless power transmitter according to an embodiment of the present disclosure, when operated in a sequence mode. FIG. 5 illustrates timing sequences in a sequence mode when there are two transmitter-side coupling circuits which are coupled to loads. As shown in FIG. 5, in the first cycle, the control circuit 11b controls the inverting circuit 11a to drive the first transmitter-side coupling circuit Coil1 to operate to transfer electric energy, and performs load detection for the first transmitter-side coupling circuit Coil1. In such case, the first detection signal COMM1 indicates that there is a load which needs electric energy. Thus, the control circuit 11b controls the inverting circuit 11a to drive the transmitter-side coupling circuit Coil1 to transfer electric energy, until the seventh cycle (P7). In the seventh cycle, the first detection signal COMM1 indicates that the load is disconnected or does not need electric energy. In such case, the control circuit 11b switches to control inverter 11a in the next cycle (i.e. the eighth cycle) to drive the second transmitter-side coupling circuit Coil2 to operate to transfer electric energy, and performs load detection for the second transmitter-side coupling circuit Coil2. In such case, the second detection signal COMM2 indicates that there is a load which needs electric energy. Thus, the control circuit 11b controls the inverting circuit 11a to drive the second transmitter-side coupling circuit Coil2 to transfer electric energy, until the eleventh cycle (P11). In the eleventh cycle, the second detection signal COMM2 indicates that the load is disconnected or does not need electric energy. In such case, the control circuit 11b switches to control inverter 11a in the next cycle (i.e. the twelfth cycle) to drive the first transmitter-side coupling circuit Coil1 to operate to transfer electric energy, and performs load detection for the first transmitter-side coupling circuit Coil1. Because there is no a load which needs electric energy, the detection signal COMM1 in the twelfth cycle indicates that there is no a load which is coupled thereto or needs electric energy. Thus, the control circuit 11b controls the wireless power transmitter to be in a standby state. The timing sequence is thus repeated.

Thus, a plurality of transmitter-side coupling circuits may be driven to operate alternately to supply electric energy to a plurality of loads, which improves system efficiency and is compatible with two different standards or two different frequencies for wireless power supply. Several different equipments may be charged or supplied with electric energy at the same time.

In a time-division mode, in a case that the first detection signal COMM1 indicates that the first transmitter-side coupling circuit Coil1 is electrically coupled to a load which needs electric energy, the control circuit 11b is configured to control the inverting circuit 11a to drive the first transmitter-side coupling circuit Coil1 to transfer electric energy continuously for a predetermined number of cycles (i.e. in the time range $T_{SHARE}$), and to drive the second transmitter-side coupling circuit Coil2 to transfer electric energy in next one cycle and perform load detection.

In a case that the second detection signal COMM2 indicates that the second transmitter-side coupling circuit Coil2 is electrically coupled to a load which needs electric energy, the control circuit 11b is configured to control the inverting circuit 11a to drive the second transmitter-side coupling circuit Coil2 to transfer electric energy continuously for a predetermined number of cycles, and to drive the first transmitter-side coupling circuit to transfer electric energy in next one cycle and perform load detection. The processes of load detection and supplying electric energy may be repeated.

Figure 6:
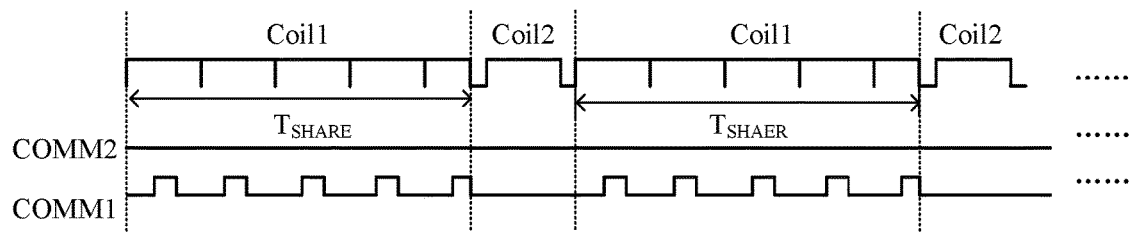
FIG. 6 is a waveform diagram of an example wireless power transmitter according to an embodiment of the present disclosure, when operated in a time-division mode.

FIG. 6 is a waveform diagram of an example wireless power transmitter according to an embodiment of the present disclosure, when operated in a time-division mode. FIG. 6 illustrates timing sequences in a time-division mode when there is only one transmitter-side coupling circuit being coupled to a load. As shown in FIG. 6, in the first cycle, the control circuit 11b controls the inverting circuit 11a to drive the first transmitter-side coupling circuit Coil1 to operate to transfer electric energy, and performs load detection for the first transmitter-side coupling circuit Coil1. In such case, the first detection signal COMM1 indicates that there is a load which needs electric energy. Thus, the control circuit 11b controls the inverting circuit 11a to drive the first transmitter-side coupling circuit Coil1 to transfer electric energy, continuously for a predetermined number of cycles, for example, 5 cycles as shown in FIG. 6, which is denoted as the time range $T_{SHARE}$. In the fifth cycle, the first detection signal COMM1 still indicates that is a load which needs electric energy. However, in the next cycle, i.e. the sixth cycle, the control circuit 11b controls the inverting circuit 11a to stop driving the first transmitter-side coupling circuit Coil1, and switch to drive the second transmitter-side coupling circuit Coil2 and perform load detection. In a case that the second detection signal COMM2 indicates that there is no a load being coupled thereto, the control circuit 11b controls the inverting circuit 11a in next one cycle, i.e. the seventh cycle, to switch back to drive the first transmitter-side coupling circuit Coil1 to operate to transfer electric energy, and the first detection circuit 11c performs load detection. In such case, the first detection signal COMM1 indicates that there is a load which needs electric energy. Thus, the control circuit 11b controls the inverting circuit 11a again to drive the first transmitter-side coupling circuit Coil1 to transfer electric energy, continuously for a predetermined number of cycles, for example, 5 cycles as shown in FIG. 6. The timing sequence is thus repeated.

Figure 7:
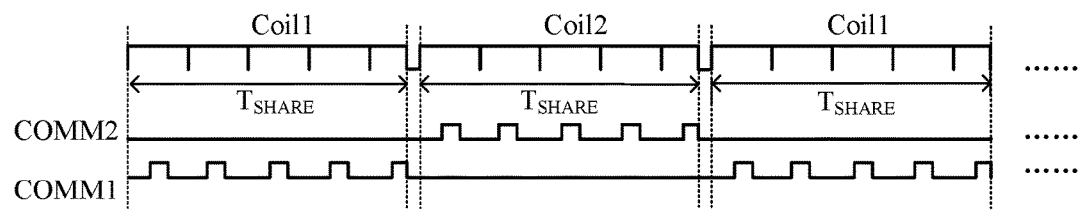
FIG. 7 is another waveform diagram of an example wireless power transmitter according to an embodiment of the present disclosure, when operated in a time-division mode.

FIG. 7 is another waveform diagram of an example wireless power transmitter according to an embodiment of the present disclosure, when operated in a time-division mode. FIG. 7 illustrates timing sequences in a time-division mode when there are two transmitter-side coupling circuits which are coupled to loads. As shown in FIG. 7, in the first cycle, the control circuit 11b controls the inverting circuit 11a to drive the first transmitter-side coupling circuit Coil1 to operate to transfer electric energy, and performs load detection for the first transmitter-side coupling circuit Coil1.

In such case, the first detection signal COMM1 indicates that there is a load which needs electric energy. Thus, the control circuit 11b controls the inverting circuit 11a again to drive the first transmitter-side coupling circuit Coil1 to transfer electric energy, continuously for a predetermined number of cycles, for example, 5 cycles as shown in FIG. 6. In the fifth cycle, the first detection signal COMM1 still indicates that is a load which needs electric energy. However, in the next cycle, i.e. the sixth cycle, the control circuit 11b controls the inverting circuit 11a to stop driving the first transmitter-side coupling circuit Coil1, and switch to drive the second transmitter-side coupling circuit Coil2 and perform load detection. In such case, the second detection signal COMM2 indicates that there is a load which needs electric energy. Thus, the control circuit 11b controls the inverting circuit 11a to drive the second transmitter-side coupling circuit Coil2 to transfer electric energy, continuously for a predetermined number of cycles. Then, the control circuit 11b controls the inverting circuit 11a in next one cycle (i.e. the seventh cycle) to switch back to drive the first transmitter-side coupling circuit Coil1 to operate to transfer electric energy and perform load detection. The time sequences are repeated.

Thus, a plurality of transmitter-side coupling circuits may be driven to operate alternately to supply electric energy to a plurality of loads, which improves system efficiency and is compatible with two different standards or two different frequencies for wireless power supply. Several different equipments may be charged or supplied with electric energy at the same time.

Figure 8:
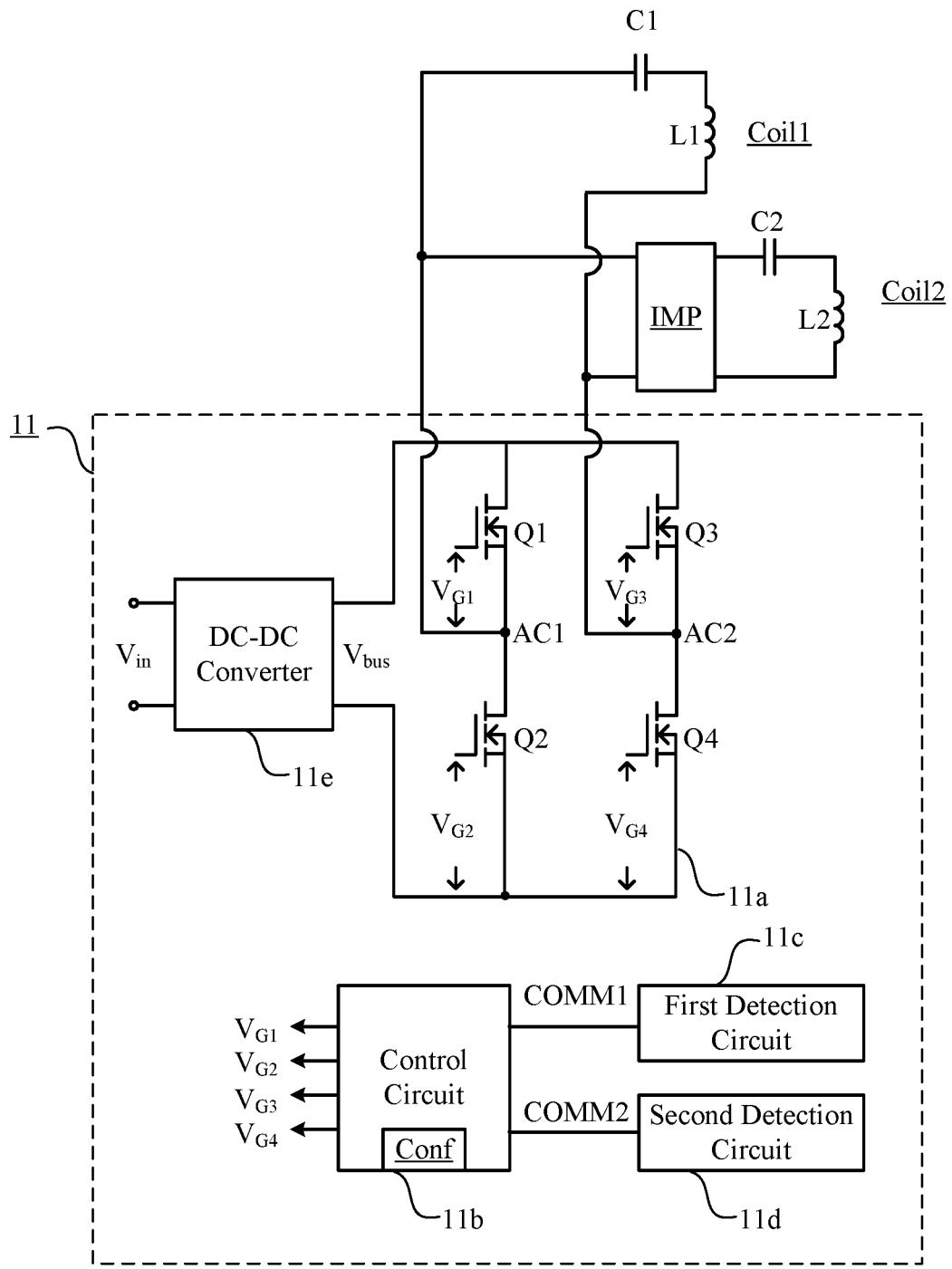
FIG. 8 is a schematic diagram of an example wireless power transmitter according to an embodiment of the present disclosure.

Furthermore, in a preferable embodiment as shown in FIG. 8, the driving circuit 11 may include a DC-DC converter 11e. The DC-DC converter 11e is provided between input terminals of the inverting circuit and input terminals of the power supply, for adjusting an input voltage/current of the inverting circuit 11a. The DC-DC converter 11e may include a power stage circuit and a control circuit for the power stage, which may be integrated with the control circuit 11b. The DC-DC converter 11e adjusts an input voltage/current of the inverting circuit 11a in accordance with a state of the inverting circuit and/or an output voltage/current parameter which is fed back from the wireless power receiver.

Firstly, the first transmitter-side coupling circuit Coil1 and the second transmitter-side coupling circuit Coil2 may be based on different power supply standards, and have different initial voltages which can be set through the configuration interface Conf. Thus, an input voltage of the inverting circuit may be adjusted by the DC-DC converter 11e, when one transmitter-side coupling circuit is switched to the other transmitter-side coupling circuit, to satisfy the requirement of rapid switching.

Secondly, in a case that one transmitter-side coupling circuit operates, an output voltage of the transmitter-side coupling circuit and an output voltage of the receiver-side coupling circuit varies according to a load state and a coupling state. The DC-DC converter 11e adjusts dynamically the input voltage/current of the inverting circuit 11a so that an output voltage of the transmitter-side coupling circuit to the load satisfies requirement or is optimal for system efficiency.

Figure 9:
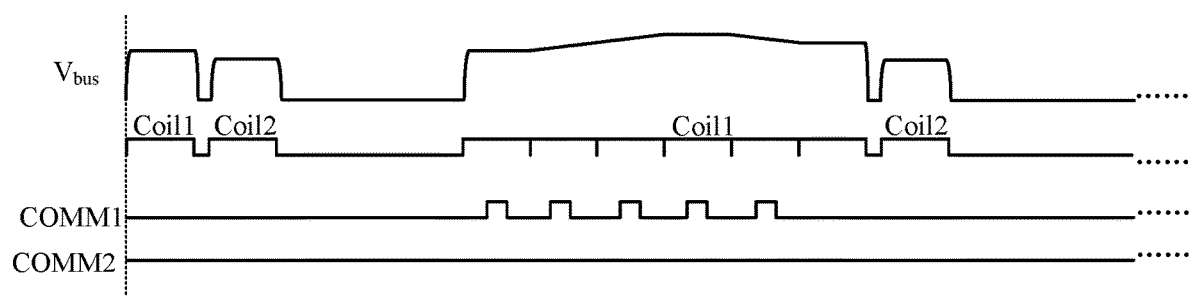
FIG. 9 is a waveform diagram of an example wireless power transmitter having a DC-DC converter according to an embodiment of the present disclosure.

FIG. 9 is a waveform diagram of an example wireless power transmitter having a according to an embodiment of the present disclosure. As shown in FIG. 9, in the first cycle, the first transmitter-side coupling circuit Coil1 is driven to operate and perform load detection. In such case, the DC-DC converter 11e converts the input voltage $V_{in}$ into a voltage $V_{bus}$ having a first value and supplies it to the inverting circuit 11a. There is no a load being detected. In the second cycle, the control circuit switches to drive the second transmitter-side coupling circuit Coil2 to operate. In such case, the DC-DC converter 11e converts the input voltage $V_{in}$ into a voltage $V_{bus}$ having a second value and supplies it to the inverting circuit 11a. When switching the transmitter-side coupling circuit which is active, the DC-DC converter 11e reset the voltage $V_{bus}$ in a reset time between one and the other.

There is no a load being detected. The control circuit 11b controls the wireless power transmitter to be in a standby state. After the standby state, the first transmitter-side coupling circuit Coil1 is driven again to operate and perform load detection. After detecting the load, the first transmitter-side coupling circuit Coil1 is driven to operate to continuously transfer electric energy, until it is detected that the load is disconnected. Meanwhile, the DC-DC converter may adjust dynamically an input voltage $V_{bus}$ of the inverting circuit in accordance with feedback parameters of the transmitter-side coupling circuit which is active and/or wireless power receiver, so as to maximize system efficiency.

It should be understood that the wireless power transmitter is described as operating in a sequence mode in FIG. 9 as an example. However, the above preferable embodiment can also be extended to those embodiments in which the wireless power transmitter operates in a time-division mode or transfers electric energy independently according to user settings.

The foregoing descriptions of specific embodiments of the present disclosure have been presented, but are not intended to limit the disclosure to the precise forms disclosed. It will be readily apparent to one skilled in the art that many modifications and changes may be made in the present disclosure. Any modifications, equivalence, variations of the preferred embodiments can be made without departing from the doctrine and spirit of the present disclosure.

The invention claimed is:

1. A driving circuit for driving a plurality of transmitter-side coupling circuits of a wireless power transmitter, comprising:
   an inverting circuit configured to generate an AC current at two output terminals of an output port of said inverting circuit by converting a DC current, wherein said plurality of transmitter-side coupling circuits are coupled in parallel between said two output terminals of said output port of said inverting circuit;
   a control circuit configured to control said inverting circuit to generate said AC current having a corresponding frequency for driving only one selected transmitter-side coupling circuit at one time; and
   wherein the remaining transmitter-side coupling circuits are operated as high-resistance circuits that are disabled to receive said AC current, and wherein element parameters of each transmitter-side coupling circuit are predetermined to make said transmitter-side coupling circuit operate at different frequencies.

2. The driving circuit according to claim 1, wherein said control circuit is configured to control said inverting circuit to drive one transmitter-side coupling circuit to operate at one time.

3. The driving circuit according to claim 1, wherein said control circuit comprises a configuration interface configured to receive a driving mode of said wireless power transmitter, wherein said control circuit controls said inverting circuit to respectively drive said plurality of transmitter-side coupling circuits to operate for different cycles, in accordance with said driving mode.

4. The driving circuit according to claim 1, further comprising:
a plurality of detection circuits being configured to correspondingly detect whether each of said plurality of transmitter-side coupling circuits is electrically coupled to a load which needs electric energy, and to provide a detection signal; and
wherein said control circuit controls said inverting circuit to drive said transmitter-side coupling circuits to transfer electric energy and to receive a corresponding detection signal from a corresponding detection circuit in one cycle, in order to detect a state of said load.

5. The driving circuit according to claim 4, wherein said detection circuit detects said load by at least one of detecting fluctuation in said corresponding transmitter-side coupling circuit, and receiving a signal from a communication module under a short-range wireless communication protocol.

6. The driving circuit according to claim 1, wherein when said selected transmitter-side coupling circuit is detected to be electrically coupled to a load which needs electric energy, said control circuit is configured to control said inverting circuit to drive said transmitter-side coupling circuit to transfer electric energy, until said load is disconnected or does not need electric energy, and to drive a next transmitter-side coupling circuit to transfer electric energy in a next one cycle.

7. The driving circuit according to claim 1, wherein when said selected transmitter-side coupling circuit is electrically coupled to a load which needs electric energy, said control circuit is configured to control said inverting circuit to drive said transmitter-side coupling circuit to transfer electric energy continuously for a predetermined number of cycles, and to drive a next transmitter-side coupling circuit to transfer electric energy in a next one cycle.

8. The driving circuit according to claim 1, wherein said control circuit turns off switches of said inverting circuit for a predetermined reset time before switching said transmitter-side coupling circuit.

9. The driving circuit according to claim 1, wherein when none of said transmitter-side coupling circuits is electrically coupled to said load which needs electric energy, said control circuit controls said wireless power transmitter in a standby state for a predetermined time period.

10. The driving circuit according to claim 9, wherein said DC-DC converter is configured to adjust an input voltage of said inverting circuit to have different values when said inverting circuit is switched to drive said transmitter-side coupling circuits.

11. The driving circuit according to claim 1, further comprising a DC-DC converter being electrically coupled between power supply terminals and input terminals of said inverting circuit, and being configured to adjust an input voltage of said inverting circuit in accordance with said load.

12. A wireless power transmitter, having a plurality of transmitter-side coupling circuits, and a driving circuit for driving said transmitter-side coupling circuits, comprising:
an inverting circuit configured to generate an AC current at two output terminals of an output port of said inverting circuit by converting a DC current, wherein said plurality of transmitter-side coupling circuits are coupled in parallel between said two output terminals of said output port of said inverting circuit;
a control circuit configured to control said inverting circuit to generate said AC current having a corresponding frequency for driving only one selected transmitter-side coupling circuit at one time; and
wherein the remaining transmitter-side coupling circuits are operated as high-resistance circuits that are disabled to receive said AC current, and wherein element parameters of each transmitter-side coupling circuit are predetermined to make said transmitter-side coupling circuit operate at different frequencies.

13. The wireless power transmitter of claim 12, wherein said control circuit is configured to control said inverting circuit to drive one transmitter-side coupling circuit to operate at one time.

14. A control method for driving a plurality of transmitter-side coupling circuits having different operation frequencies coupled in parallel between two output terminals of an output port of an inverting circuit of a wireless power transmitter, the control method comprising:
converting a DC current to generate an AC current with a predetermined frequency in accordance with the operation frequency of only one selected transmitter-side coupling circuit at one time;
controlling said selected transmitter-side coupling circuit to operate correspondingly; and
controlling remaining transmitter-side coupling circuits to be operated as high-resistance circuits that are disabled to receive said AC current, wherein element parameters of each transmitter-side coupling circuit are predetermined to make said transmitter-side coupling circuit operate at different frequencies.

15. The control method of claim 14, further comprising detecting whether each of said transmitter-side coupling circuits is electrically coupled to a load which needs electric energy.

16. The control method of claim 14, further comprising driving one transmitter-side coupling circuit which is detected to be electrically coupled to a load which needs electric energy to transfer electric energy until said load is disconnected or does not need electric energy, and to drive a next transmitter-side coupling circuit in a next one cycle.

17. The control method of claim 14, further comprising driving one transmitter-side coupling circuit which is detected to be electrically coupled to a load which needs electric energy to transfer electric energy for a predetermined number of cycles, and to drive a next transmitter-side coupling circuit in a next one cycle.

18. The control method of claim 14, further comprising controlling said wireless power transmitter to be in a standby state for a predetermined time period when none of said transmitter-side coupling circuits is detected to be electrically coupled to a load which needs electric energy.

19. The control method of claim 14, further comprising adjusting an input voltage received by said transmitter-side coupling circuits in accordance with load states correspondingly.

* * * * *